(12) United States Patent
Cho et al.

(10) Patent No.: US 6,937,396 B2
(45) Date of Patent: Aug. 30, 2005

(54) HYBRID LENS WITH HIGH NUMERICAL APERTURE

(75) Inventors: Eun-hyoung Cho, Kyungki-do (KR);
Jin-seung Sohn, Seoul (KR);
Myung-bok Lee, Kyungki-do (KR);
Young-pil Park, Seoul (KR)

(73) Assignee: Sumsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/647,510

(22) Filed: Aug. 26, 2003

(65) Prior Publication Data

US 2004/0090678 A1 May 13, 2004

(30) Foreign Application Priority Data

Nov. 11, 2002 (KR) ................................. 10-2002-0069593

(51) Int. Cl.[7] .................................................. G02B 5/18
(52) U.S. Cl. ........................................................ 359/569
(58) Field of Search ................................. 359/566, 565, 359/569, 571

(56) References Cited

U.S. PATENT DOCUMENTS 5,349,471 A * 9/1994 Morris et al. ............... 359/565
5,715,091 A * 2/1998 Meyers ....................... 359/565

* cited by examiner

Primary Examiner—Mark A. Robinson
Assistant Examiner—Alessandro Amari
(74) Attorney, Agent, or Firm—Burns, Doane, Swecker & Mathis, LLP

(57) ABSTRACT

A hybrid lens with a high numerical aperture is described. The hybrid lens comprises a refractive surface that refracts incident light and a diffractive surface that diffracts light exiting the lens, the diffracting surface designed by a sag satisfying the following Equation:

$$sag = \frac{f_D + m\lambda - \sqrt{f_D^2 + r^2}}{n-1},$$

wherein $f_D$ is a distance from a center peak to a focal point of the hybrid lens, r is a height from a center axis to each peak of the hybrid lens, n is the refractive index of the hybrid lens, λ is the wavelength of incident light and m is an integer. The hybrid lens is small and lightweight and capable of removing chromatic aberration.

4 Claims, 5 Drawing Sheets

HYBRID LENS WITH HIGH NUMERICAL APERTURE

BACKGROUND OF THE INVENTION

This application claims priority from Korean Patent Application No. 2002-69593, filed on Nov. 11, 2002, in the Korean Intellectual Property Office, the disclosure of which is incorporated herein in its entirety by reference.

1. Field of the Invention

The present invention relates to a hybrid lens combining a diffractive lens with a refractive lens, and more particularly to a hybrid lens with a high numerical aperture used in an optical information recording/reproducing apparatus.

2. Description of the Related Art

The development of an optical information media has led from CDs (Compact disks) having a diameter of 12 cm and a substrate thickness of 1.1 mm to DVDs (Digital Versatile Disks) having a diameter of 12 cm and a substrate thickness of 0.6 mm and is further leading toward blue-ray disc that are thinner than DVDs. Optical apparatuses for recoding and reproducing information from such optical information media have also been researched and developed so that high recording density can be achieved by focusing high optical energy into a small spot. For example, an optical recoding/reproducing apparatus for CDs adopts a light source having a wavelength of 780 nm and a lens having a numerical aperture (NA) of 0.45. Meanwhile, an optical recoding/reproducing apparatus for DVDs adopts a light source having a wavelength of 680 nm and a lens having a numerical aperture of 0.6. The blue-ray disc which is still being researched actively is designed for a light source having a wavelength of about 405 nm and a lens having a numerical aperture of about 0.85. However, manufacturing a lens with such a high numerical aperture is still difficult with a current technology.

FIG. 1 is a diagram showing the relationship between numerical aperture (NA), spot size and depth of focus $\Delta z$ of a general lens 11.

In FIG. 1, D denotes an aperture of the lens 11, f denotes a focal length and $\theta$ denotes an angle of refraction of the light transmitted through the lens. The following Equation 1 defines numerical aperture (NA), wherein n denotes a refractive index of the lens and $\theta$ denotes a refractive angel thereof. The following Equation 2 gives the relationship between spot size $\omega_0$, numerical aperture NA and wavelength $\lambda$, when an incident beam is parallel. The following Equation 3 gives the relationship between depth of focus $\Delta z$, numerical aperture NA and wavelength $\lambda$.

$$NA = n \sin \theta \quad (1)$$

$$\omega_0 = \frac{2}{\pi} \frac{\lambda}{NA} \quad (2)$$

$$\Delta z = \frac{\lambda}{2NA^2} \quad (3)$$

Spot size should be reduced in order to increase information recording density, and according to Equation 2, wavelength $\lambda$ should be reduced and numerical aperture NA should be increased in order to reduce spot size $\omega_0$. Accordingly, to record and reproduce information on a blue-ray disc, a blue laser with a short wavelength and a lens with a high numerical aperture are required.

However, it is necessary to increase the depth of focus $\Delta z$ for a stable recording and reproduction, and according to Equation 3, it is necessary to increase the wavelength $\lambda$ and decrease the numerical aperture (NA) to increase the depth of focus $\Delta z$.

To satisfy the Equation 2 and 3, in the case of the blue-ray disc, a cover layer of the disc preferably is manufactured to have about 0.1 mm thickness effectively, which prevents the depth of focus from being shortened, which results from the increase of numerical aperture and decrease of wavelength, thereby increasing the information recording density. However, there is a problem in that increasing the numerical aperture occurs reduction of a tilt allowance range (that is, tilt margin) of the recording surface and light axis. The tilt allowance range can be expanded up to a current DVD level by forming a thinner cover layer of about 0.1 mm. It is possible to maintain allowable ranges of disc deflection and tilt of the blue-ray disc, as well as apparatus assembly errors, etc. at the same level as in DVDs.

The refractive lens used in the optical recording/reproducing medium changes the wavelength of incident laser depending on temperatures. While light with different wavelengths is passed through the refractive lens, the the different wavelengths are focused having different focal lengths in the light axis direction. This is called chromatic aberration.

In the prior art, a thick lens with a large radius of curvature, a low refractive index, and a high Abbe number has been proposed in order to achieve a high numerical aperture while reducing chromatic aberration and dispersion. However, such a lens is difficult to manufacture, and it is large and heavy, making it inappropriate for use in a small and lightweight information recording/reproducing apparatus.

SUMMARY OF THE INVENTION

Embodiments of the present invention provide a small and lightweight hybrid lens with a high numerical aperture, having no chromatic aberration.

According to an aspect of the present invention, there is provided a hybrid lens comprising a refractive surface that refracts incident light and a diffractive surface that diffracts light exiting the lens, the diffracting surface designed by a sag satisfying the following Equation:

$$sag = \frac{f_D + m\lambda - \sqrt{f_D^2 + r^2}}{n-1} \quad (4)$$

wherein $f_D$ is a distance from a center peak to a focal point of the lens, r is a height from a center axis to each peak of the lens, n is a refractive index of the lens, $\lambda$ is the wavelength of incident light, and m is an integer.

The refractive surface has a low-order aspheric profile z satisfying the following Equation 5, $$z(r) = \frac{cr^2}{1 + \sqrt{1 - (1+k)c^2 r^2}} + Ar^4 + Br^6 + Cr^8 + Dr^{10}, \quad (5)$$

wherein c is a curvature of the refractive surface, k is a conic coefficient representing a shape of the refractive surface and A, B, C and D are fourth, sixth, eighth and tenth aspheric coefficients, respectively. Wherein a minimum diffraction pitch of the diffractive surface is preferably 3 $\mu$m, the numerical aperture of the refractive surface is preferably above 0.85 and the diffractive surface has a depth $L_m$ satisfying the following Equation 6.

$$Lm = \frac{\lambda}{n-1} \quad (6)$$

According to another aspect of the present invention, there is provided a small and lightweight hybrid lens with a high numerical aperture, capable of removing chromatic aberration by including a low-order refractive surface and a diffractive surface designed by the profile defined simply in Equation 4.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a hybrid lens according a preferred embodiment of the present invention will be described in detail with reference to appended drawings.

Figure 1:
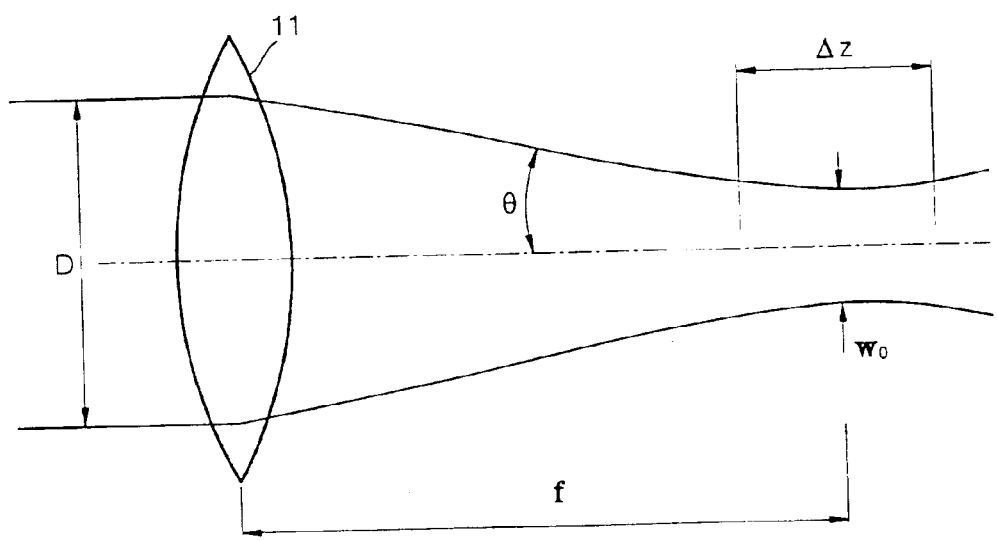
FIG. 1 is a diagram showing the relationship between numerical aperture (NA), spot size $\omega_0$ and depth of focus $\Delta z$ of a general lens.
Figure 2:
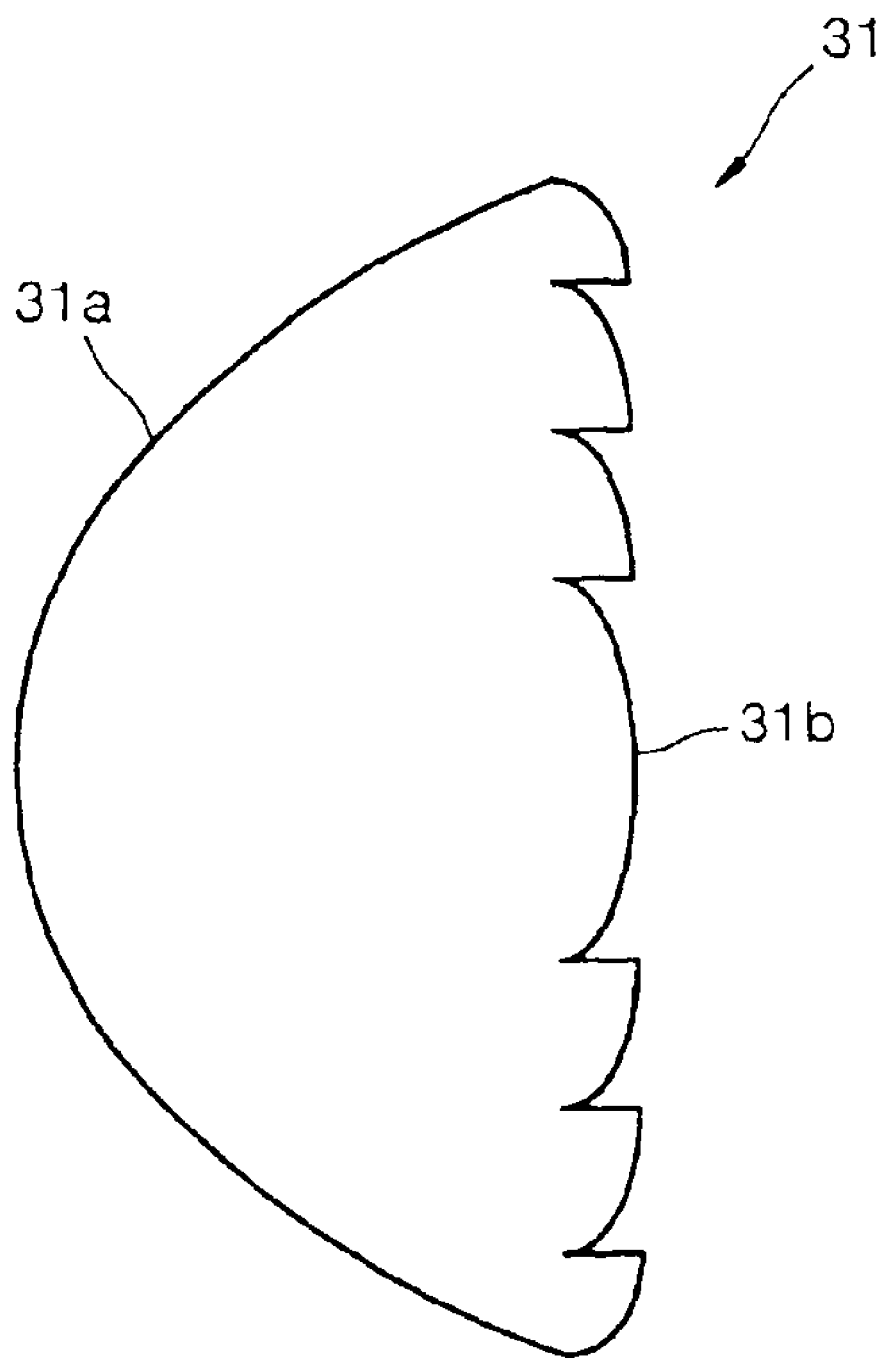
FIG. 2 is a sectional view showing the structure of a hybrid lens according to a preferred embodiment of the present invention.

FIG. 2 is a sectional view schematically showing the structure of the hybrid lens according to the preferred embodiment of the present invention.

With reference to FIG. 2, a hybrid lens 31 according to the preferred embodiment of the present invention includes a refractive surface 31a formed with a low-order aspheric profile z defined in Equation 5 and a diffractive surface 31b having a profile sag defined in Equation 4. A process for obtaining Equation 4 will be described in detail with reference to FIG. 4. Equation 5 is a formula obtained by selecting only terms below a tenth order from a general formula relating to the refractive surface, such as the following Equation 7, wherein, k is a conic coefficient, and when k is a value between −1 and 0, the refractive surface is an ellipsoid.

$$z(r) = \frac{cr^2}{1 + \sqrt{1 - (1+k)c^2 r^2}} + Ar^4 + Br^6 + Cr^8 + Dr^{10} + Er^{12} + Fr^{14} + \ldots \quad (7)$$

For example, in the case that LASFN30, manufactured by SCHOTT Corp., having a mid-range refractive index, is used as a material for forming the hybrid lens, the lens has a refractive index of about 1.83 and a medium amount of dispersion occurs at a wavelength of 408 nm. Here, the refractive index or dispersion of the lens material depends on wavelength, and therefore a suitable material should be selected on the basis of the wavelength of the light source.

A principle of correcting chromatic aberration in the hybrid lens according to the preferred embodiment of the present invention will be described with reference to FIGS. 3A to 3C.

Figure 3A:
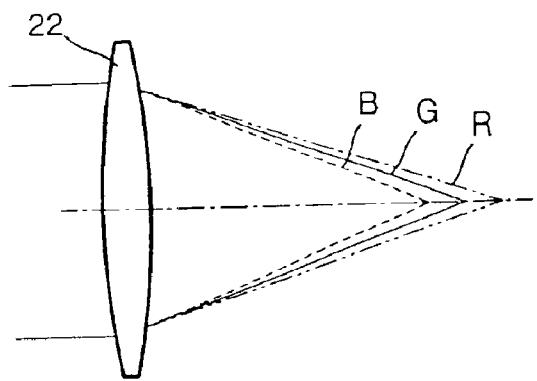
FIGS. 3A to 3C are views showing chromatic aberration in a refractive device, a diffractive device and a hybrid device, respectively.
Figure 3B:
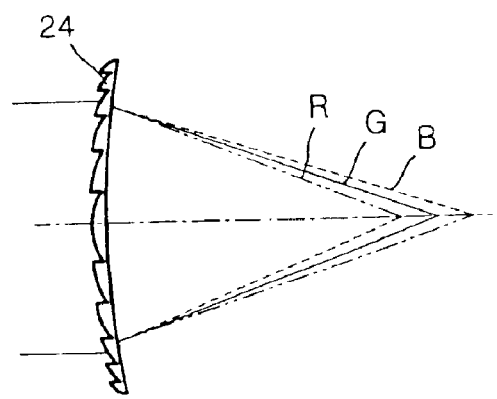
Figure 3C:
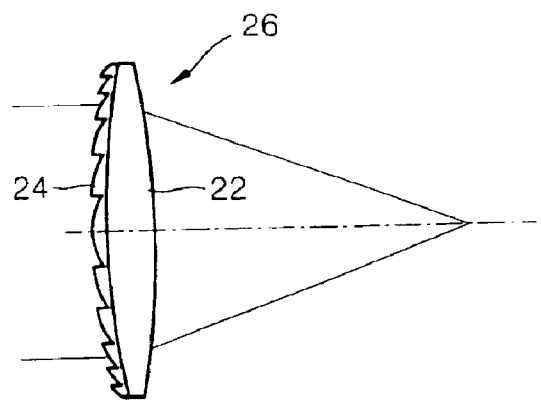

FIGS. 3A to 3C show chromatic aberration in a refractive device, a diffractive device, and a hybrid device combining the diffractive device with the refractive device, respectively.

With reference to FIG. 3a, because the angle of refraction increases as the wavelength decrease, blue (B), green (G) and red (R) light refracted by a refractive device 22 is focused at a progressively greater distance from the refractive device 22. This phenomenon of chromatic aberration, the focal length increasing with wavelength increasing is called.

On the other hand, referring to FIG. 3b, because the angle of diffraction increase as the wavelength increases, red (R), green (G) and blue (B) light diffracted by the diffractive device 24 is focused at a progressively greater distance from a diffractive device 24. That is, the diffractive device 24 generates chromatic aberration in which the focal length increases as the wavelength decreases, opposite to the chromatic aberration of the refractive device. Here, the diffractive device 24 is a fault-type in which a phase-type diffractive lattice is formed on one surface of a glass lens. The property of the diffractive device 24, diffracting incident light at an angle that increases, opposite to the refractive device, is an important property.

Accordingly, to remove the opposite types of chromatic aberration generated the refractive device 22 and diffractive device 24, a hybrid device 26 combining the two optical devices is constructed as shown in FIG. 3C.

In a conventional optical system, a convex lens and concave lens are arranged together in order to correct chromatic aberration, and a suitable shape or material is selected to increase the refractive index of the convex lens in order to assist dispersion of light in the concave lens. However, which these methods are used in an optical system with a large refractive index, there is a disadvantage that aberration such as spherical aberration, chromatic aberration, etc., is increased. However, it is possible to decrease the refractive index of the optical device and reduce chromatic aberration without increasing another type of aberration by using the-fault type diffractive device.

Because the refractive device of the prior art used so far has a high Abbe number, it is necessary to significantly increase power of the optical device in order to correct chromatic aberration. However, because chromatic aberration in an optical device having a low Abbe number may change significantly even when the power of the optical device is changed only slightly, it is possible to remove spherical aberration or coma aberration, etc., by adopting an optical device with a low Abbe number without increasing the power of the optical device.

The diffractive device, when converted to a general optical device, has a absolute value of the Abbe number of 3.45 as an index representing refractive index to light wavelength. This value is a smaller value by one decimal figure than that of the general optical glass. In the case of designing the optical system, the diffractive device with the low Abbe number has the advantage to correct not only chromatic aberration but also various other types of aberration. The pitch of the diffractive device may be controlled to decrease spherical aberration, as in the aspheric lens.

Accordingly, the hybrid lens according to the preferred embodiment of the present invention can remove chromatic aberration by combining the refractive device having a high Abbe number with the diffractive device having a low Abbe number, and simultaneously remove other types of aberration by appropriately controlling the pitch of the diffractive device.

Figure 4:
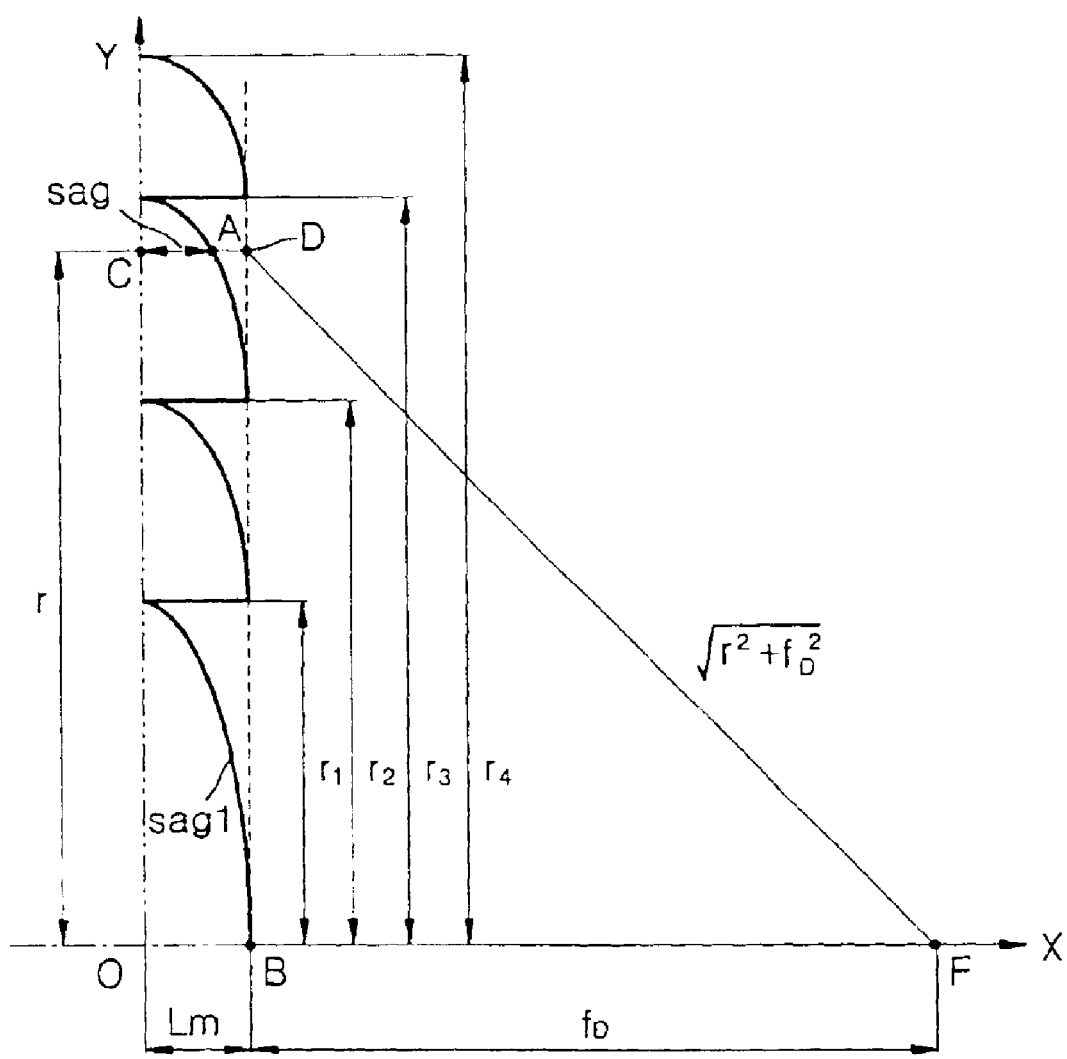
FIG. 4 is a view showing a diffractive surface structure and profile of the hybrid lens according to the preferred embodiment of the present invention.

FIG. 4 is a view showing a diffractive surface structure and profile sag of the hybrid lens according to the preferred embodiment of the present invention.

With reference to FIG. 4, when an optical path difference between an optical path from a point O to a point F and an optical path from a point C to a point F is an integer number of wavelengths, constructive interference occurs and the intensity of a focal point F on a writing surface is maximum. The optical path between the points C and F is the sum of the optical paths between the points C and A (=sag·n), between the points A and D (=($L_m$−sag)·1) and between the points D and F (=$\sqrt{r^2+f_D^2}$·1). The optical path between the points O and F is the sum of the optical paths between the points O and B (=$L_m$·n) and between the points B and F (=$F_D$·1). Accordingly, a condition for constructive interference is given by the following Equation 8.

$$\sqrt{r^2+f_D^2}\cdot 1 + sag\cdot n + (L_m - sag)\cdot 1 - f_D\cdot 1 - L_m\cdot n = m\lambda \qquad (8)$$

The depth $L_m$ of the diffractive surface of the hybrid lens in Equation 8 satisfies the above Equation 6 and thus a formula defining the diffractive surface of the hybrid lens according to the preferred embodiment of the present invention is obtained by combining Equations 6 and 8 and rearranging the resultant equation for sag, as seen in the following Equation 9.

$$sag = \frac{f_D + (m'+1)\lambda - \sqrt{f_D^2 + r^2}}{n-1} = \frac{f_D + m\lambda - \sqrt{f_D^2 + r^2}}{n-1} \qquad (9)$$

Here, m' is an arbitrary integer. Thus, m is used instead of m'+1.

Figure 5:
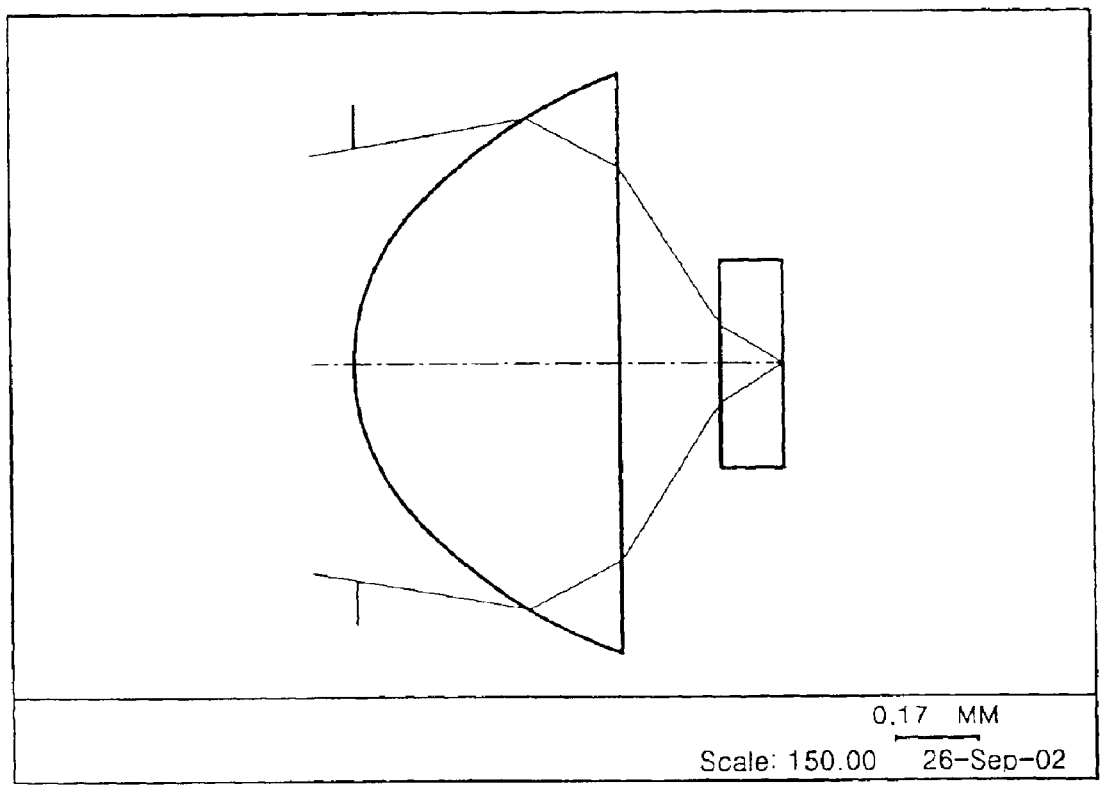
FIG. 5 shows results of a simulation of the hybrid lens according to the preferred embodiment of the present invention.

FIG. 5 shows results of a simulation of the hybrid lens according to the preferred embodiment of the present invention. In the simulation, a minimum pitch is set to 2.943 μm and a lens etching depth is processed to 220 μm. Under these conditions, it is found that a wavefront error is 0.0053 μm smaller than 0.07 λrms (root mean square), a diffraction efficiency is 92.11%, a lens decenter tolerance is 22 μm smaller than 0.07 λrms, a surface decenter tolerance is 12 μm, a surface tilt tolerance is 0.55 deg smaller than the standard 0.75 deg, and a defocus is 36 nm for a 1 nm wavelength change, smaller than the standard of 80 nm for a 1 nm λ change. Therefore, it is possible to design a hybrid lens having excellent performance in all respects.

The hybrid lens according to the preferred embodiment of the present invention has the advantages of a high numerical aperture above 0.85, no chromatic aberration, has a small tolerance, compact size, lightweight, and it is easy to manufacture.

While the present invention has been particularly shown and described with reference to a preferred embodiment thereof, it will be understood by those of ordinary skill in the art that various changes in form and details may be made therein without departing from the spirit and scope of the present invention as defined by the following claims. For example, the above-mentioned pitch may be adjusted.

What is claimed is:

1. A hybrid lens comprising a refractive surface that refracts incident light and a diffractive surface that diffracts light exiting the lens, the diffracting surface designed by a sag satisfying the following Equation, $$sag = \frac{f_D + m\lambda - \sqrt{f_D^2 + r^2}}{n-1},$$

wherein $f_D$ is a distance from a center peak to a focal point of the hybrid lens, r is a height from a center axis to each peak of the hybrid lens, n is the refractive index of the hybrid lens λ is the wavelength of incident light, and m is an integer, and wherein the refractive surface has a low-order aspheric profile z satisfying the following Equation:

$$z(r) = \frac{cr^2}{1+\sqrt{1-(1+k)c^2r^2}} + Ar^4 + Br^6 + Cr^8 + Dr^{10},$$

wherein c is a curvature of the refractive surface, k is a conic coefficient greater than O representing a shape of the refractive surface, and A, B, C and D are fourth, sixth, eighth and tenth aspheric coefficients respectively.

2. The hybrid lens of claim 1, wherein the diffractive surface has a minimum diffraction pitch of 3 μm.

3. The hybrid lens of claim 1, wherein the refractive surface has a numerical aperture above 0.85.

4. The hybrid lens of claim 1, wherein the diffractive surface has a depth $L_m$ satisfying the following Equation:

$$L_m = \frac{\lambda}{n-1}.$$

* * * * *